United States Patent [19]

Hegi

[11] Patent Number: 4,521,648

[45] Date of Patent: * Jun. 4, 1985

[54] AUTOMATIC DIALER FOR TELEPHONE NUMBERS

[75] Inventor: Paul Hegi, Bernex, Switzerland

[73] Assignee: Lupa Finances S.A., Luxembourg, Luxembourg

[*] Notice: The portion of the term of this patent subsequent to Sep. 25, 2001 has been disclaimed.

[21] Appl. No.: 628,262

[22] Filed: Jul. 6, 1984

Related U.S. Application Data

[62] Division of Ser. No. 411,038, Aug. 24, 1982, Pat. No. 4,473,720.

[30] Foreign Application Priority Data

Sep. 23, 1981 [CH] Switzerland ............... 6127/81

[51] Int. Cl.³ .................................. H04M 1/274
[52] U.S. Cl. ................................... 179/90 B
[58] Field of Search ............ 179/90 B, 90 BB, 90 BD

[56] References Cited

U.S. PATENT DOCUMENTS

| | | | |
|---|---|---|---|
| 3,555,201 | 1/1971 | Kuehnle et al. | 179/90 |
| 3,665,113 | 5/1972 | Blake et al. | 179/90 B |
| 4,011,414 | 3/1977 | Warren | 179/90 B |
| 4,039,761 | 8/1977 | Nicoud et al. | 179/90 B |
| 4,126,768 | 11/1978 | Grenzow | 179/90 B |

FOREIGN PATENT DOCUMENTS 2437120 4/1980 France .
54-118107 9/1979 Japan .
WO81/02481 3/1981 PCT Int'l Appl. .

Primary Examiner—Stafford D. Schreyer
Attorney, Agent, or Firm—Young & Thompson

[57] ABSTRACT

An automatic dialer for telephone numbers comprises a control unit (100), a memory unit (200), a keyboard unit (300), a display unit (400), units for voltage feed (550) and regulation (500), units for amplification (600) and automatic regulation of signal level (700), a signal shaping unit (900) and a unit for connection with a telephone line (800). At least the memory unit (200) is housed in a removable portion that plugs into a fixed portion containing the other units. This memory unit contains identification information corresponding to a local telephone network; and a memory of the control unit contains identification information corresponding to the local telephone network to which this fixed portion is connected. The control unit comprises a comparator comparing the identification information of a fixed portion and of the removal portion which plugs into this fixed portion, and controls modifications of the operating program of the control unit as a function of the result of this comparison.

16 Claims, 1 Drawing Figure

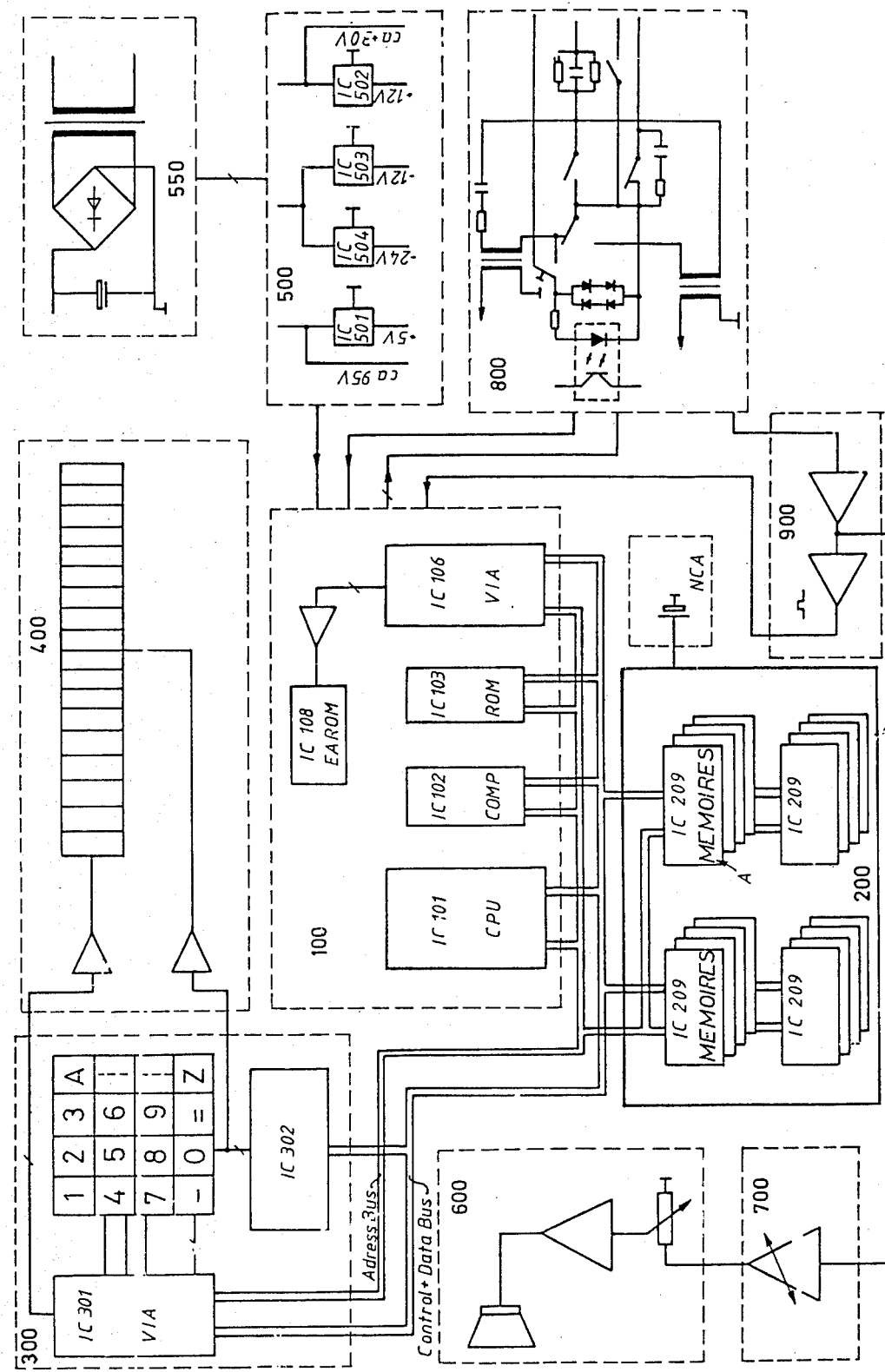

AUTOMATIC DIALER FOR TELEPHONE NUMBERS

This application is a division, of application Ser. No. 411,038, filed Aug. 24, 1982 now U.S. Pat. No. 4,473,720.

There exist various types of automatic dialers for telephone numbers such for example as the one developed by the applicant and termed "Multimil 2031" permitting memorizing more than two hundred telephone numbers of twenty digits. A certain number of these telephone numbers may be automatically called by the actuation of special buttons while others, less frequently used are called with the aid of a code of two or three digits typed on a keyboard, the keyboard serving also to dial the whole of the telephone numbers which are not recorded in the memories of the automatic dialer.

The principal drawback of such an automatic dialer is that it is personalized, that is to say it is programmed to dial automatically the telephone numbers which its habitual user frequently calls. Moreover if this user wishes to make use of these automatic calls he is obliged to make them on his individual apparatus.

The present invention has for its object an automatic dialer of telephone numbers adapted to overcome the recited drawbacks by virtue of the fact that it comprises a fixed portion, connected to a telephone apparatus or a telephone network comprising a microprocessor provided with a storage memory, on the one hand, FOR the information that varies from one country to another relating to frequencies and intervals for the recognition of tonalities, intervals for selection and identification information relating to the particular station such as local or international codes of the place where the fixed portion of the typewriter is installed, and on the other hand, the same information relating to local and international codes of other localities; by the fact that it comprises also a removable portion provided with a memory storing, on the one hand the telephone numbers wanted by the user, and on the other hand, identification information comprising local and international codes identical to those of said fixed portion; and by the fact that the microprocessor is programmed such that after the insertion of the movable portion in the fixed portion, it asks the identification information of the movable portion, compares it with the identification information of the fixed portion and modifies, if the identification information is not identical, the local and/or international codes of the telephone numbers stored in the memory of the removable portion as a function of said identification information of the fixed portion.

The accompanying drawing shows schematically and by way of example a form of embodiment of the automatic dialer according to the invention in the form of a schematic block diagram.

The automatic dialer shown schematically in the drawing operates with a microprocessor 6500 as control unit which comprises a data bus of eight bits and an address bus of sixteen bits as well as a control bus.

The connections of this microprocessor with the control units are by way of an interface 6522. All the operations of the dialer are supervised and controlled by the microprocessor On the schematic block diagram the different functions. have been assembled as units to permit better description and understanding of the different unit functions. This grouping in units comprises the following units:

Control unit 100
Memory unit 200
Keyboard 300
Display 400
Voltage control 500
Feed 550
Audioamplification 600
Automatic level control 700
Connection with telephone line 800
Signal shaping 900.

A certain number of these units are already known and used in the "Multimil 2000" and "Multimil 2031D" apparatus and will not be described in detail here. In particular these units are keyboard 300, display 400, feed and voltage control 550 and 500, audioamplification 600, automatic level control 700, connection with telephone line 800 and signal shaping 900. A detailed description of the operation and construction of these units may be found for example in the brochure relating to "Multimil 2031D" now on the market.

Control unit 100 comprises a central program unit CPU 6502, one or more ROM program memories (IC103) comprised for example by EPROM 2K×8 2716, comparator IC102, EAROM memory (IC108) 100×14 ER 1400 and a VIA interface (IC106) 6522.

In the EAROM memory (IC108) are recorded when the apparatus is constructed the information that varies from country to country such as frequencies and ranges for the recognition of the tonality of a free line, a busy line, etc., the selection intervals for the dialing of a number to be called as well as the various international and local codes permitting the selection of the countries and regions in those countries. In this EAROM memory IC108 is also recorded identification information for example in the form of the local code and the international code of the location of the automatic dialer. It is apparent that this identification information is introduced by the user himself with the aid of the keyboard and the elements which comprise the unit 300.

Although in the illustrated example the units 100, 300, 400, 550, 500, 600, 700, 800 and 900 are mounted on a fixed portion of the automatic dialer adapted to be connected to a telephone network or to a local telephone station, the memory unit 200 comprises a removable portion of the automatic typewriter, that can be plugged into the fixed portion of the latter.

This memory unit 200 comprises memories of the type RAM or COSRAM IC209 in which are entered and memorized, by means of the unit comprising keyboard 300, the numbers of the correspondents which the user wishes to call frequently and their short code of one, two or three digits. These recorded telephone numbers comprise for the local numbers, that is those of the local network to which is connected the fixed portion of the dialer, simply the number of the subscriber in question.

If the subscriber to be reached is located in another local network than that to which the fixed portion of the automatic dialer is connected, the number of the correspondent comprises in addition to his calling number the local code of the local network of which it is a part.

If the subscriber to be reached is located in another country, in addition to the calling number of the correspondent there is also recorded his local code and his international code.

Moreover, in a portion A of one of the RAM memories IC209 there is recorded identification which consists of the local code and the international code corresponding to the fixed portion of the dialer to which this removable portion belongs.

Finally, one of the ROM memories for example the program memory IC103 of control unit 100 comprises an identification program which when a removable portion of an automatic dialer is plugged into the fixed portion of such an automatic dialer interrogates the identification information of the removable portion and compares it to the identification information of the fixed portion.

Three cases may arise during utilization of the described automatic dialer:

a. The identification information of the fixed and removable portions is identical which is to say that the calling numbers memorized in the removable portion have been recorded by means of a fixed portion which is a part of the same local telephone network as that with which the memory unit of the removable portion had been recorded.

In this case the program memory ROM IC103 having initiated this comparison and established the identity of the identification information instructs the central program unit CPU to utilize the normal utilization program of the memory unit. This normal program comprises for example selection by the appropriate code by means of tabulator unit 300 of a complete telephone number, which is to say as the case may be of the international code and local code and the subscriber's number memorized in the memory unit of the removable portion of the automatic dialer. In this case the operation of the present automatic dialer is then identical to that of Multimil 2031ID.

b. Secondly the user wishes to utilize the removable portion of the automatic dialer conjointly with the compatible fixed portion but connected to another local network of the country where the fixed portion pertaining to said user is connected.

In this case the identification information of the removable portion is only partially identical to that of the utilized fixed portion. Thus, the international code is identical but the local code is not.

The program memory ROM IC103 having effectuated the comparison of the identification information and determined the partial identity only of the latter, it instructs the central program unit CPU to modify the normal operating program in the sense that to each national call using a calling number recorded in the memory of the removable portion including no international code nor local code, a local code will be added by means of the memory EAROM IC108, corresponding to the local code of the place of domicile of the user. Moreover, for each national calling number directed to the local network to which is connected the fixed portion momentarily used by the user, the local code which is in the memory of the removable portion is suppressed.

Thus let us suppose that the identification information of the fixed portion momentarily used is:
International access 00
Interurban access 0
Country code 41
Interurban code 01
and that the identification information of the removable portion of the utilizer is:
International access 00
Interurban access 0
Country code 41
Interurban code 22.

When the user using his removable portion with a borrowed fixed portion and wishing to reach the Geneva correspondent whose number is memorized in the form of a simple subscriber number of six digits 12.34.56 with a fixed portion connected to the Zurich network the calling number is automatically provided with the access and the interurban Geneva code 0.22 before the subscriber number.

C. Thirdly the user having recorded the memory of the portable portion of the automatic dialer on a fixed portion at Geneva in Switzerland goes to Stockholm in Sweden and wishes to use this removable portion with a fixed portion of an automatic dialer connected to the Stockholm network.

The identification information of the portable portion, recorded at Geneva is:
International access 00
Interurban access 0
Country code 41
Interurban code 22.

The identification information of the fixed portion of the automatic dialer located at Stockholm is:
International access 009
Interurban access 0
Country code 46
Interurban code 8.

The memory of the portion recorded at Geneva carries for example the following call numbers:

| | |
|---|---|
| (1) a local number for Geneva | 47 04 55 |
| (2) a number in Germany | 00/49/30/795366 |
| (3) a number in Stockholm | 00/46/8/7131414 |

If this removable portion is used at the fixed Swedish station then these numbers will be automatically modified as follows:
(1) 099/41/22/47 04 55
(2) 009/49/30/79 53 66
(3) 7131414.

In the first case there will accordingly be automatically added to the Geneva number the international access 009, the Swiss code 41 and the Geneva code 22 before the subscriber number.

In the second case, the apparatus simply replaces the international access 00 with 009.

And in the third case the international access 00, the country code and the interurban code are suppressed.

It will thus be seen that a user having a removable portion of an automatic dialer may record the memories of the latter by means of his usual fixed station and then use the same removable portion, with no modification at all, with no matter what other compatible automatic dialer connected to other local or national networks.

The connection of a removable portion to a fixed portion of an automatic dialer may be effected by plugging in or any other known way permitting connecting the RAM memories IC209 to the address and control and information busses of the microprocessor of the fixed portion.

In the described embodiment the removable portion of the automatic dialer comprises solely the memory 200, while all the other units 100, 300 to 900 are contained in the fixed portion of the automatic dialer.

It will be seen that in these modifications of the dialer the removable portion may comprise in addition to the memory unit all or part of the units of control 100, tabulation 300 and display 400. It is evident that these elements which would thus be incorporated in the removable portions of the dialer would no longer be located in the fixed portion of the latter.

It is also evident that the technology used for the construction of the automatic dialer is of little importance. The essential novelty of this automatic dialer for telephone numbers resides in the fact that it comprises a fixed portion or station connected to a predetermined telephone network and a removable portion adapted to be carried by the user and used with any other compatible fixed station without the need for the telephone numbers of the usual correspondents of the user recorded in the electronic apparatus of the removable portion having to be modified. The microprocessor or electronic portion of the dialer, housed in part in the fixed station and in part in the portable portion, memorizes the information, as well as the codes and program instructions, needed to be known as a function of which local telephone network the memories of the portable portion have been recorded and modifies the recordings in an automatic way as a function of the telephone network to which the utilized fixed portion is connected.

According to other modifications, the memory unit may contain other information, such as the calling numbers for police, fire department, etc.

It is obvious that various forms of the memories may be provided in the fixed portion of the apparatus which then would also comprise a memory unit.

What I claim is:

1. In an apparatus for automatically output pulsing telephone numbers to a telephone network, said apparatus comprising a control means, a memory means and a keyboard means, the improvement in which:
    said memory means comprises a removable portion for storing telephone number identification information including local network identification for each telephone number;
    said memory means comprises a fixed portion for storing local network identification information for said fixed portion;
    said keyboard means is adapted to select telephone number identification information for each telephone number stored in said removable portion;
    said control means responds to and generates necessary output pulses corresponding to telephone number identification information for each telephone number selected regardless of the coincidence or lack of coincidence of the local network identification information stored in the removable portion and the fixed portion of the memory means.

2. The apparatus of claim 1 wherein at least a portion of the control means is removable.

3. The apparatus of claim 1 wherein said keyboard means is removable.

4. The apparatus of claim 1 wherein said telephone number identification information includes an international access code, and inter-urban access code, a country code and an inter-urban code.

5. The apparatus of claim 1 wherein said control means includes means for comparing said local network identification information stored in the removable portion and the fixed portion, and means for generating output signals to the telephone network in response to the comparison.

6. The apparatus of claim 5 wherein said local network identification information includes an inter-urban code.

7. The apparatus of claim 6 wherein said local network identification information includes an inter-urban access code.

8. The apparatus of claim 6 wherein the local network identification information includes an international code.

9. The apparatus of claim 8 wherein the local network identification information includes an international access code.

10. A method of operating apparatus for automatically output pulsing telephone numbers to a telephone network, said apparatus comprising a removable portion and a fixed portion, said method comprising the following steps:
    (a) storing telephone number identification information in the removable portion including local network identification information;
    (b) storing local network identification information in the fixed portion;
    (c) coupling the removable portion to the fixed portion;
    (d) selecting a telephone number having telephone identification information stored in the removable portion;
    (e) comparing the local network identification information stored in the fixed portion with the local network identification information for the selected number stored in the removable portion; and
    (f) generating output pulses to the telephone network in response to the comparison, said output pulses including appropriate network identification information and telephone number identification information for the telephone number selected.

11. The method of claim 10 including the step of storing telephone number identification information including local network identification which differs from the stored local network identification information in the fixed portion.

12. The method of claim 10 including the step of storing telephone number identification information in the removable portion including local network identification information which is the same for at least one number as the stored local network identification information in the fixed portion.

13. The method of claim 10 wherein the local network identification information stored in the removable portion and the fixed portion includes an inter-urban code.

14. The method of claim 10 wherein the local network identification information stored in the removable portion and the fixed portion includes a country code.

15. The method of claim 10 wherein the local network identification stored in the removable portion and the fixed portion includes international and inter-urban access codes.

16. Apparatus for automatically output pulsing telephone numbers to a telephone network, said apparatus comprising:
    processor means;
    memory means coupled to said processor means for storing telephone number identification information, said memory means including a removable RAM and a fixed portion;

operator input means coupled to said processor means for entering codes corresponding to a selected telephone number stored in said RAM;

said RAM storing said telephone number identification information for a plurality of telephone numbers including local network identification for each of said numbers;

said fixed portion of said memory means storing local network identification for the location of the fixed portion;

said processor addressing said RAM to retrieve telephone number identification for a telephone number selected at said operator input means;

said processor comparing the local network identification for the retrieved telephone number identification information and the local network information stored in the fixed portion;

said processor generating output signals including the selected telephone number identification information to the telephone network in response to the said comparison.

* * * * *